United States Patent
Brizendine et al.

(10) Patent No.: US 10,377,177 B1
(45) Date of Patent: Aug. 13, 2019

(54) ADAPTIVE BEARING PRELOAD ADJUSTMENT SYSTEM

(71) Applicant: GM Global Technology Operations LLC, Detroit, MI (US)

(72) Inventors: Chad R. Brizendine, Fenton, MI (US); Rodney J. Campbell, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/894,289

(22) Filed: Feb. 12, 2018

(51) Int. Cl.
*F16C 25/08* (2006.01)
*B60B 35/00* (2006.01)
*F16C 39/02* (2006.01)

(52) U.S. Cl.
CPC ............ *B60B 35/004* (2013.01); *F16C 39/02* (2013.01); *B60B 2380/14* (2013.01); *B60B 2380/50* (2013.01); *F16C 2229/00* (2013.01); *F16C 2361/31* (2013.01)

(58) Field of Classification Search
CPC ........ F16C 19/386; F16C 25/06; F16C 25/08; F16C 25/083; F16C 2229/00; F16C 2361/31
See application file for complete search history.

(56) References Cited

U.S. PATENT DOCUMENTS

| 2014/0274544 A1* | 9/2014 | Downs | F16H 48/38 |
| | | | 475/246 |
| 2016/0369843 A1* | 12/2016 | Kim | B60B 27/001 |
| 2017/0002862 A1* | 1/2017 | Katsaros | F16O 25/06 |

FOREIGN PATENT DOCUMENTS

DE   3143344 A1 * 5/1983 ............. B23Q 1/265

* cited by examiner

*Primary Examiner* — Phillip A Johnson
(74) *Attorney, Agent, or Firm* — Cantor Colburn LLP

(57) ABSTRACT

An axle assembly includes an axle housing having a passage. An axle extends through the passage. A bearing supports the axle in the passage. An adaptive bearing preload adjustment system is mounted adjacent the bearing. The adaptive bearing preload adjustment system is selectively activatable to adaptively adjust a preload force on the bearing.

7 Claims, 4 Drawing Sheets

ADAPTIVE BEARING PRELOAD ADJUSTMENT SYSTEM

INTRODUCTION

The subject disclosure relates to the art of vehicles and, more particularly, to an adaptive bearing preload adjustment system for a vehicle.

Vehicles typically include multiple axles that support wheels for rotation. The axles are supported by bearings. Typically, bearings are provided with a preload in the form of a selected axial force. The preload promotes proper axial alignment, particularly during cornering and/or high torque maneuvering. Generally, the preload is selected for a "worst case scenario" condition.

More specifically, current systems do not allow for a preload adjustment, so an axial force is selected that will promote desired axle alignment at an outer edge of a design envelope. Increasing the preload also increases friction on the bearing. An increase in friction increases rolling resistance which leads to a reduction in fuel mileage performance. Accordingly, it is desirable to provide a system that may actively adjust bearing preload to accommodate real time driving conditions.

SUMMARY

In accordance with an aspect of an exemplary embodiment, an axle assembly includes an axle housing having a passage. An axle extends through the passage. A bearing supports the axle in the passage. An adaptive bearing preload adjustment system is mounted adjacent the bearing. The adaptive bearing preload adjustment system is selectively activatable to adaptively adjust a preload force on the bearing.

In addition to one or more of the features described herein the bearing includes an outer race and an inner race, the adaptive bearing preload adjustment system being selectively activatable to apply the preload to the inner race.

In addition to one or more of the features described herein the adaptive bearing preload adjustment system includes an adjustment assembly having a first member and a second member.

In addition to one or more of the features described herein the adjustment assembly includes a first pocket formed in the first member, a second pocket formed in the second member and a bearing element arranged in the first and second pocket.

In addition to one or more of the features described herein the first pocket includes a first ramped surface and the second pocket includes a second ramped surface.

In addition to one or more of the features described herein one of the first member and the second member abuts the inner race of the bearing.

In addition to one or more of the features described herein a motor is operatively connected to the other of the first member and the second member.

In accordance with another aspect of an exemplary embodiment, a vehicle includes a prime mover, a transmission assembly coupled to the prime mover, and at least one axle assembly connected to the transmission assembly. The at least one axle assembly includes an axle housing having a passage. An axle extends through the passage. A bearing supports the axle in the passage, and an adaptive bearing preload adjustment system is mounted adjacent the bearing. The adaptive bearing preload adjustment system is selectively activatable to adaptively adjust a preload force on the bearing.

In addition to one or more of the features described herein the bearing includes an outer race and an inner race, the adaptive bearing preload adjustment system being selectively activatable to apply the preload to the inner race.

In addition to one or more of the features described herein the adaptive bearing preload adjustment system includes an adjustment assembly having a first member and a second member, at least one of the first member and the second member abutting the inner race.

In addition to one or more of the features described herein the adjustment assembly include a first pocket including a first ramped surface formed in the first member, a second pocket including a second ramped surface formed in the second member and a bearing element arranged in the first and second pocket.

In addition to one or more of the features described herein a motor is operatively connected to the other of the first member and the second member.

In accordance with yet another aspect of an exemplary embodiment, a method of adaptively adjusting a preload on a vehicle axle bearing includes sensing a force on an axle of a vehicle, determining a selected preload to support the force, and adjusting the preload on the vehicle axle bearing.

In addition to one or more of the features described herein adjusting the preload includes shifting a first member of an adaptive bearing preload adjustment system relative to a second member of the adaptive bearing preload adjustment system, at least one of the first and second members abutting the bearing.

In addition to one or more of the features described herein adjusting the preload includes shifting a ball along a first ramped surface of the first member and a second ramped surface of the second member shifting at least one of the first and second members axially.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
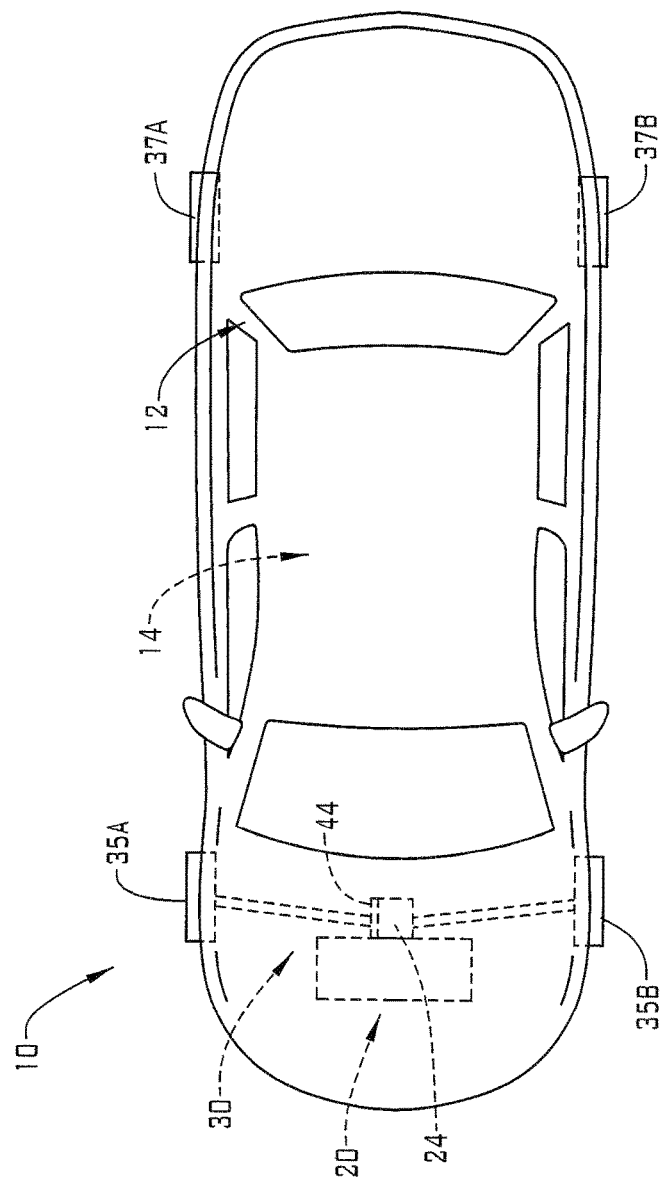
FIG. 1 depicts a vehicle including an adaptive bearing preload adjustment system, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with an exemplary embodiment, is indicated generally at 10 in FIG. 1. Vehicle 10 includes a body 12 that defines, at least in part, a passenger compartment 14. It should be understood that vehicle 10 may take on a variety of forms including passenger vehicles, sport utility vehicles (SUVs), trucks, farm equipment, or other mechanisms that include axles supported by one or more bearings. Vehicle 10 includes a prime mover 20 that is operatively connected to a transmission assembly 24. Prime mover 20 may take on a variety of forms including internal combustion engines, electric motors and combinations thereof.

Transmission assembly 24 is operatively connected with an axle assembly 30. Axle assembly 30 is connected to a first front wheel 35a and a second front wheel 35b. While shown in a front wheel drive configuration, transmission assembly 24 may be connected to a rear axle (not shown) that connects to first and second rear wheels 37a and 37b. Further, transmission assembly 24 could be configured to provide power to all four wheels 35a, 35b, 37a and 37b.

In accordance with an aspect of an exemplary embodiment, axle assembly 30 includes an adaptive bearing preload adjustment system 44. While shown in connection with axle assembly 30 associated with front wheels 35a and 35b, rear axles (not shown) that are associated with first and second rear wheels 37a and 37b may also include an adaptive bearing preload adjustment system (also not shown). That is, while shown as part of a transaxle assembly, it should be understood that the adaptive bearing preload system may be incorporated into rear wheel drive, four-wheel drive, and all-wheel drive vehicles. For example, an adaptive bearing preload adjustment system may be incorporated into an input shaft of a front axle assembly and/or to an input shaft of a rear differential assembly.

Figure 2:
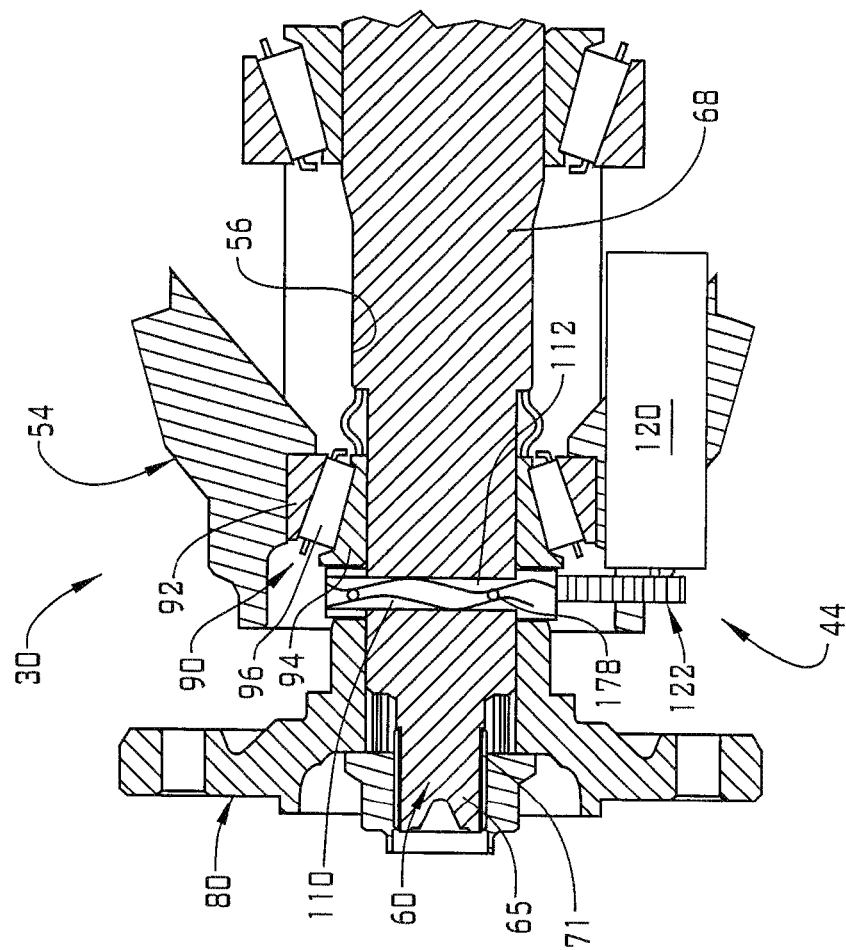
FIG. 2 depicts an axle assembly including an adaptive bearing preload adjustment system in a disengaged configuration, in accordance with an aspect of an exemplary embodiment.
Figure 3:
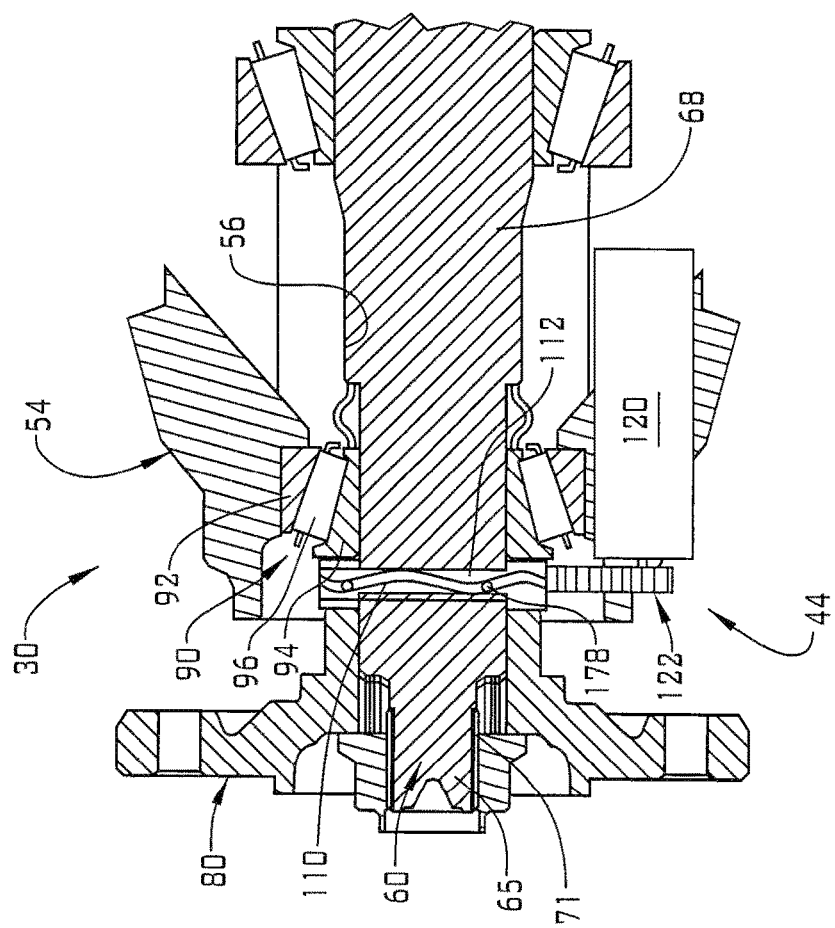
FIG. 3 depicts an axle assembly including an adaptive bearing preload adjustment system in an engaged configuration, in accordance with an aspect of an exemplary embodiment.

As shown in FIGS. 2 and 3 adaptive bearing preload adjustment system 44 includes a housing 54 that defines, at least in part, a passage 56. An axle 60, which forms part of axle assembly 30, extends through passage 56. Axle 60 includes a first end (not shown) coupled to transmission assembly 24, a second end 65 and an intermediate portion 68 extending therebetween. Second end 65 may include a plurality of splines 71 that interface with corresponding splines (not separately labeled) on a hub 80. Hub 80 may support first front wheel 35a.

A bearing 90 rotatably supports axle 60 in passage 56. Bearing 90 includes an outer race 92, an inner race 94 and a plurality of bearing elements 96 arranged therebetween. In accordance with an aspect of an exemplary embodiment, adaptive bearing preload adjustment system 44 is arranged axially adjacent to bearing 90. Adaptive bearing preload adjustment system 44 includes a first member 110 fixedly mounted relative to housing 54 and a second member 112 that may selectively axially translate relative to bearing 90. Second member 112 may abut inner race 94 of bearing 90. The term "abut" should be understood to describe that second member 112 may selectively deliver a force to inner race 94. Therefore, "abut" may include directly abutting, e.g., direct contact between second member 112 and inner race 94. "Abut" may also include indirect contact between second member 112 and inner race 94.

More specifically, second member 112 includes an outer surface (not separately labeled) that may include gear teeth (also not separately labeled). A motor 120 is selectively activated to rotate a gear 122 that meshingly engages with the gear teeth on second member 112. In this manner, motor 120 causes an axial translation of second member 112 relative to first member 110 between a first or disengaged configuration (FIG. 2) and a second or engaged configuration (FIG. 3). In the engaged configuration, motor 120 may adjust a position of second member 112 to apply a selected preload that accommodates changes in driving conditions.

Figure 4:
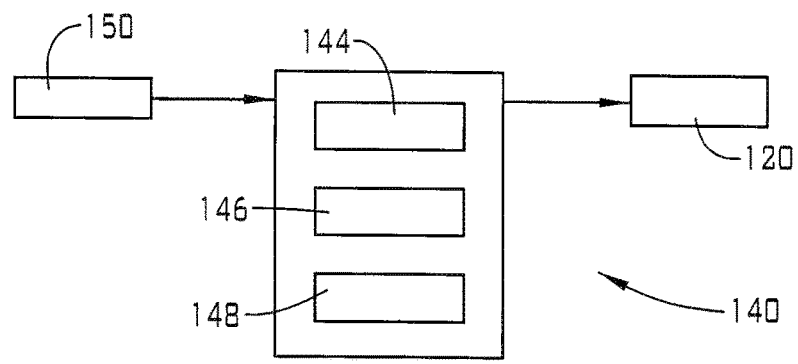
FIG. 4 depicts a block diagram illustrating a control system for the adaptive bearing preload adjustment system, in accordance with an aspect of an exemplary embodiment.

In accordance with an exemplary aspect, motor 120 is operatively connected to a control system 140 illustrated in FIG. 4. Control system 140 includes a central processing unit (CPU) module 144, a non-volatile memory module 146 and an adaptive preload control module 148. Control system 140 is operatively connected to a sensor 150. Sensor 150 may detect an acceleration of vehicle 10. Based on sensed speed, control system 140 may activate adaptive bearing preload adjustment system 44 to selectively adjust a preload force on bearing 90 to accommodate changes in acceleration forces experienced by axle assembly 30.

Figure 5:
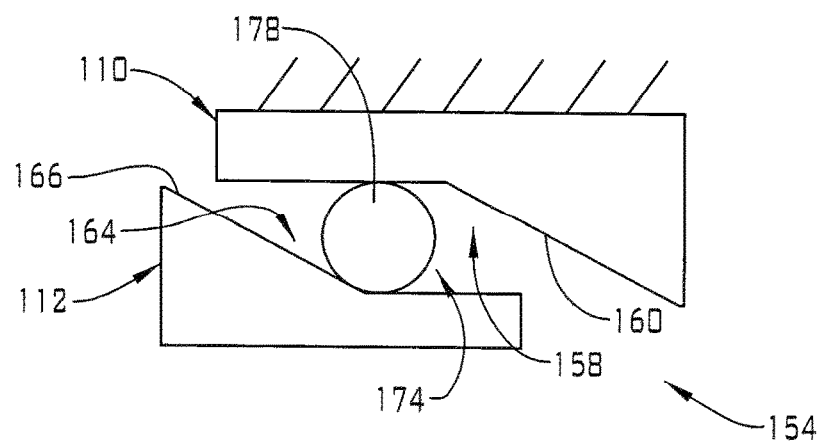
FIG. 5 depicts a detailed view of an adjustment assembly of the adaptive bearing preload adjustment system, in accordance with an aspect of an exemplary embodiment.

Reference will now follow to FIG. 5 in describing an adjustment mechanism 154 of adaptive bearing preload adjustment system 44. Adjustment mechanism 154 includes a first pocket 158 having a first ramped surface 160 formed in first member 110 and a second pocket 164 including a second ramped surface 166 formed in second member 112. An adjustment member 174 shown in the form of a ball 178 is arranged between first and second members 110 and 112 in first and second pockets 158 and 164.

In accordance with an exemplary aspect, rotation of second member 112 through motor 120 causes adjustment member 174 to translate along first and second ramped surfaces 160 and 166. The movement of adjustment member 174 results in axial movement of second member 112 relative to first member 110. The term "axial movement" should be understood to describe movement along an axis of rotation of the axle. An amount of that axial movement may be controlled to establish a selected preload on bearing 90. For example, upon receiving a signal indicating a change in driving conditions, such as acceleration, adaptive preload control module 148 may reference a look-up table stored in non-volatile memory module 146 to determine how much preload should be applied to bearing 90. The amount of preload may vary depending on a magnitude of the change in driving condition.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:
1. An axle assembly comprising:
an axle housing including a passage;
an axle extending through the passage;
a bearing supporting the axle in the passage, the bearing including an outer race and an inner race; and an adaptive bearing preload adjustment system mounted adjacent the bearing, the adaptive bearing preload adjustment system including an adjustment assembly having a first member having formed therein a first pocket and a second member having formed therein a second pocket and a bearing element arranged in the first pocket and the second pocket, the adaptive bearing preload adjustment system being selectively activatable to adaptively adjust a preload force on the inner race of the bearing.

2. The axle assembly according to claim 1, wherein the first pocket includes a first ramped surface and the second pocket includes a second ramped surface.

3. The axle assembly according to claim 1, wherein one of the first member and the second member abuts the inner race of the bearing.

4. The axle assembly according to claim 3, further comprising: a motor operatively connected to the other of the first member and the second member.

5. A vehicle comprising:
   a prime mover;
   a transmission assembly coupled to the prime mover; and
   at least one axle assembly connected to the transmission assembly, the at least one axle assembly comprising:
       an axle housing including a passage;
       an axle extending through the passage;
       a bearing supporting the axle in the passage, the bearing including an outer race and an inner race; and
       an adaptive bearing preload adjustment system mounted adjacent the bearing, the adaptive bearing preload adjustment system includes an adjustment assembly having a first member including a first pocket having a first ramped surface formed therein and a second member including a second pocket having a second ramped surface formed therein, at least one of the first member and the second member abutting the inner race and a bearing element arranged in the first and second pocket, adaptive bearing preload adjustment system being selectively activatable to adaptively adjust a preload force on the inner race of the bearing.

6. The vehicle to claim 5, further comprising: a motor operatively connected to the other of the first member and the second member.

7. A method of adaptively adjusting a preload on a vehicle axle bearing comprising:
   sensing a force on an axle of a vehicle;
   determining a selected preload to support the force; and
   adjusting the preload on the vehicle axle bearing by shifting a first member of an adaptive bearing preload adjustment system relative to a second member of the adaptive bearing preload adjustment system where at least one of the first and second members abutting the bearing and shifting a ball along a first ramped surface of the first member and a second ramped surface of the second member shifting at least one of the first and second members axially.

* * * * *